US 9,628,228 B2

United States Patent
Yoo et al.

(10) Patent No.: US 9,628,228 B2
(45) Date of Patent: Apr. 18, 2017

(54) TIME AND FREQUENCY ACQUISITION AND TRACKING FOR OFDMA WIRELESS SYSTEMS

(71) Applicant: QUALCOMM Incorporated, San Diego, CA (US)

(72) Inventors: Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/943,336

(22) Filed: Jul. 16, 2013

(65) Prior Publication Data

US 2014/0135025 A1 May 15, 2014

Related U.S. Application Data

(62) Division of application No. 12/900,285, filed on Oct. 7, 2010, now Pat. No. 9,401,784.
(Continued)

(51) Int. Cl.
*H04W 72/00* (2009.01)
*H04L 5/00* (2006.01)
(Continued)

(52) U.S. Cl.
CPC ......... *H04L 5/0032* (2013.01); *H04B 1/7097* (2013.01); *H04B 15/00* (2013.01);
(Continued)

(58) Field of Classification Search
CPC ............ H04L 5/0032; H04L 27/2657; H04W 72/082; H04B 1/7097; H04B 15/00; H04J 11/005; H04J 11/0069
(Continued)

(56) References Cited

U.S. PATENT DOCUMENTS

| | | |
|---|---|---|
| 5,555,257 A | 9/1996 | Dent |
| 6,847,630 B2 | 1/2005 | Blanz et al. |

(Continued)

FOREIGN PATENT DOCUMENTS

| | | |
|---|---|---|
| CN | 1300170 A | 6/2001 |
| CN | 1497993 A | 5/2004 |

(Continued)

OTHER PUBLICATIONS

TD Tech., et al., "Text proposal to 25.866 on synchronization schemes for 1.28Mcps TDD Home Node B", 3GPP Draft; R3-092133, 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, Aug. 24, 2009 (Aug. 24, 2009), XP050391662.
(Continued)

*Primary Examiner* — Md Talukder
(74) *Attorney, Agent, or Firm* — Nerrie M. Zohn

(57) ABSTRACT

Obtaining a timing reference in wireless communication is facilitated when desiring to communicate with a weak serving base station (such as an evolved NodeB) in the presence of a stronger interfering base station. The user equipment (UE) may track a stronger interfering base station's timing, or the UE may track a timing that is derived by a composite power delay profile (PDP) from multiple base stations. The composite PDP may be constructed by adjusting individual base station PDPs according to a weighting scheme. The timing obtained in such a manner may be used for estimation of the channel of the interfering base station and cancelling interfering signals from the base station. It may also be used to estimate the channel of the serving base station after adding a backoff. The UE may track a stronger interfering base station's frequency, or the UE may track a composite frequency.

12 Claims, 10 Drawing Sheets

Related U.S. Application Data

(60) Provisional application No. 61/253,790, filed on Oct. 21, 2009.

(51) Int. Cl.
*H04B 15/00* (2006.01)
*H04B 1/7097* (2011.01)
*H04J 11/00* (2006.01)
*H04L 27/26* (2006.01)
*H04W 24/02* (2009.01)
*H04W 72/08* (2009.01)

(52) U.S. Cl.
CPC ......... *H04J 11/005* (2013.01); *H04J 11/0069* (2013.01); *H04L 27/2657* (2013.01); *H04L 27/2662* (2013.01); *H04W 24/02* (2013.01); *H04W 72/082* (2013.01); *H04B 2201/70701* (2013.01); *H04B 2201/70702* (2013.01); *H04L 5/0048* (2013.01)

(58) Field of Classification Search
USPC .............. 455/452.1, 554.2, 560, 69, 522
See application file for complete search history.

(56) References Cited

U.S. PATENT DOCUMENTS

| | | | |
|---|---|---|---|
| 7,450,907 B2 | 11/2008 | Shurvinton et al. | |
| 7,463,576 B2 | 12/2008 | Krishnan et al. | |
| 7,801,091 B2 | 9/2010 | Chillariga et al. | |
| 8,023,955 B2 | 9/2011 | Anderson et al. | |
| 8,072,918 B2 | 12/2011 | Muharemovic et al. | |
| 8,233,907 B1* | 7/2012 | Shah | H04W 24/00 370/329 |
| 2002/0187786 A1 | 12/2002 | Takano et al. | |
| 2003/0007471 A1 | 1/2003 | Terasawa et al. | |
| 2003/0119451 A1 | 6/2003 | Jang et al. | |
| 2004/0072566 A1 | 4/2004 | Kuwahara et al. | |
| 2004/0072572 A1 | 4/2004 | Nakamura et al. | |
| 2004/0110518 A1 | 6/2004 | Swift et al. | |
| 2004/0131029 A1 | 7/2004 | Tobe et al. | |
| 2005/0111408 A1* | 5/2005 | Skillermark | H04B 1/7105 370/331 |
| 2005/0111526 A1 | 5/2005 | Bilgic et al. | |
| 2005/0255819 A1 | 11/2005 | Kawamoto et al. | |
| 2005/0276315 A1 | 12/2005 | Shimizu et al. | |
| 2005/0282547 A1 | 12/2005 | Kim et al. | |
| 2006/0063556 A1 | 3/2006 | Palenius et al. | |
| 2006/0072500 A1 | 4/2006 | Kent et al. | |
| 2007/0049275 A1 | 3/2007 | Simeon | |
| 2007/0054681 A1 | 3/2007 | Suh et al. | |
| 2007/0140203 A1 | 6/2007 | Qiao | |
| 2007/0149227 A1 | 6/2007 | Parizhsky et al. | |
| 2007/0149238 A1* | 6/2007 | Das | H04W 52/16 455/522 |
| 2007/0159969 A1* | 7/2007 | Das | H04W 72/0413 370/229 |
| 2007/0230510 A1* | 10/2007 | You | H04B 7/269 370/503 |
| 2007/0230590 A1 | 10/2007 | Choi et al. | |
| 2007/0242782 A1* | 10/2007 | Han | H04B 1/7105 375/343 |
| 2007/0243878 A1 | 10/2007 | Taira et al. | |
| 2008/0130790 A1 | 6/2008 | Forenza et al. | |
| 2008/0212515 A1 | 9/2008 | Yomo et al. | |
| 2008/0232513 A1 | 9/2008 | Wang et al. | |
| 2009/0016321 A1 | 1/2009 | Li et al. | |
| 2009/0034482 A1 | 2/2009 | Hahm et al. | |
| 2009/0046671 A1 | 2/2009 | Luo | |
| 2009/0098830 A1 | 4/2009 | Simmons et al. | |
| 2009/0109919 A1 | 4/2009 | Bertrand et al. | |
| 2009/0116473 A1 | 5/2009 | Lindoff et al. | |
| 2009/0131009 A1 | 5/2009 | Hepler et al. | |
| 2009/0143016 A1 | 6/2009 | Li | |
| 2009/0149169 A1* | 6/2009 | Tanno | H04B 1/7083 455/422.1 |
| 2009/0215480 A1 | 8/2009 | Kim et al. | |
| 2009/0225743 A1* | 9/2009 | Nicholls | H04J 3/0688 370/350 |
| 2009/0279420 A1 | 11/2009 | Koyanagi | |
| 2010/0008317 A1 | 1/2010 | Bhattad et al. | |
| 2010/0039948 A1 | 2/2010 | Agrawal et al. | |
| 2010/0080323 A1 | 4/2010 | Mueck et al. | |
| 2010/0137013 A1 | 6/2010 | Ren | |
| 2010/0195566 A1* | 8/2010 | Krishnamurthy | H04L 5/0007 370/328 |
| 2010/0220626 A1* | 9/2010 | Das | H04W 72/1284 370/252 |
| 2010/0238906 A1 | 9/2010 | Komatsu | |
| 2010/0285792 A1 | 11/2010 | Chen et al. | |
| 2010/0317343 A1 | 12/2010 | Krishnamurthy et al. | |
| 2011/0007717 A1 | 1/2011 | Swarts et al. | |
| 2011/0092231 A1 | 4/2011 | Yoo et al. | |
| 2011/0098054 A1 | 4/2011 | Gorokhov et al. | |
| 2011/0223867 A1* | 9/2011 | Chae | H04B 7/0404 455/63.1 |
| 2011/0228837 A1 | 9/2011 | Nentwig | |
| 2011/0261909 A1 | 10/2011 | Andgart et al. | |
| 2011/0286376 A1 | 11/2011 | Yoo et al. | |
| 2012/0051287 A1 | 3/2012 | Merlin et al. | |
| 2012/0076040 A1* | 3/2012 | Hoshino | H04W 24/10 370/252 |
| 2012/0214524 A1 | 8/2012 | Wajcer et al. | |
| 2013/0033998 A1 | 2/2013 | Seo et al. | |
| 2013/0201950 A1 | 8/2013 | Wang et al. | |
| 2013/0231123 A1 | 9/2013 | Yoo et al. | |
| 2013/0308466 A1* | 11/2013 | Yoo | H04B 1/7097 370/241 |
| 2014/0094188 A1* | 4/2014 | Kazmi | G01S 5/0242 455/456.1 |
| 2014/0135025 A1* | 5/2014 | Yoo | H04B 1/7097 455/452.1 |
| 2015/0163050 A1 | 6/2015 | Han et al. | |

FOREIGN PATENT DOCUMENTS

| | | | |
|---|---|---|---|
| CN | 1604500 A | 4/2005 | |
| CN | 1697336 A | 11/2005 | |
| CN | 1905730 A | 1/2007 | |
| CN | 1906862 A | 1/2007 | |
| CN | 101164364 A | 4/2008 | |
| CN | 100433673 C | 11/2008 | |
| EP | 1107483 A1 | 6/2001 | |
| EP | 1564903 A2 | 8/2005 | |
| EP | 1887823 A1 * | 2/2008 | ............ H04B 1/707 |
| EP | 1906686 A1 | 4/2008 | |
| EP | 2079121 A1 | 7/2009 | |
| EP | 2079212 A1 | 7/2009 | |
| JP | H0946762 A | 2/1997 | |
| JP | 2001237769 A | 8/2001 | |
| JP | 2002101446 A | 4/2002 | |
| JP | 2003234671 A | 8/2003 | |
| JP | 2003309491 A | 10/2003 | |
| JP | 2004120586 A | 4/2004 | |
| JP | 2004135210 A | 4/2004 | |
| JP | 2004159343 A | 6/2004 | |
| JP | 2005510123 A | 4/2005 | |
| JP | 2005521347 A | 7/2005 | |
| JP | 2005354459 A | 12/2005 | |
| JP | 2006115206 A | 4/2006 | |
| JP | 2006140631 A | 6/2006 | |
| JP | 2006287663 A | 10/2006 | |
| JP | 2009239568 * | 10/2009 | ............ H04B 1/707 |
| JP | 2009239568 A | 10/2009 | |
| JP | 2010518669 A | 5/2010 | |
| JP | 2010532592 A | 10/2010 | |
| JP | 2010533433 A | 10/2010 | |
| KR | 20060047838 A | 5/2006 | |
| KR | 20070120988 A | 12/2007 | |
| WO | 03005610 | 1/2003 | |
| WO | 03043229 | 5/2003 | |
| WO | 03081931 A1 | 10/2003 | |

(56) References Cited

FOREIGN PATENT DOCUMENTS

| WO | WO-2008093101 A2 | 8/2008 |
|---|---|---|
| WO | 2008118514 A2 | 10/2008 |
| WO | 2009009366 A1 | 1/2009 |
| WO | WO-2009059986 A2 | 5/2009 |

OTHER PUBLICATIONS

European Search Report—EP13155951—Search Authority—Munich—Apr. 18, 2013.
Garcia L G U, et al., "Autonomous component carrier selection: interference management in local area environments for LTE-advanced", IEEE Communications Magazine, IEEE Service Center, Piscataway, US, vol. 47, No. 9, Sep. 1, 2009 (Sep. 1, 2009), pp. 110-116, XP011283372, ISSN: 0163-6804, DOI: DOI:10.1109/MCOM.2009.5277463.
International Search Report and Written Opinion—PCT/US2010/053583—ISA/EPO—Apr. 8, 2011.
Taiwan Search Report—TW099135952—TIPO—Jun. 21, 2013.
Zhuang A et al., "Comparison-of decision-directed and pilot-aided algorithms for complex channel tap estimation in a downlink WCDMA system", Personal, Indoor and Mobile Radio Communications, 2000, PIMRC 2000, Th E 11th IEEE International Symposium on Sep. 18-21, 2000, Piscataway, NJ, USA, IEEE, vol. 2, Sep. 18, 2000 (Sep. 18, 2000), pp. 1121-1125, XP010520807, ISBN: 978-0-7803-6463-9.
3rd Generation Partnership Project, Technical Specification Group Radio Access Network, Further Advancements for E-UTRA Physical Layer Aspects (Release 9 ), 3GPP Standard, 3GPP TR 36.814, 3rd Generation Partnership Project (3GPP), Mobile Competence Centre , 650, Route Des Lucioles , F-06921 Sophia-Antipolis Cedex , France, No. V0.4.1, Feb. 1, 2009 (Feb. 1, 2009), pp. 1-31, XP050380817.
"Efficient UE Signaling in Support of DL CoMP," 3GPP TSG RAN WG1 Meeting # 58, Shenzhen, China, Aug. 24-28, 2009, pp. 1-4.
European Search Report—EP14159337—Search Authority—Munich—Jun. 18, 2014.
Taiwan Search Report—TW102135197—TIPO—Dec. 3, 2014.

\* cited by examiner

TIME AND FREQUENCY ACQUISITION AND TRACKING FOR OFDMA WIRELESS SYSTEMS

CROSS REFERENCE TO RELATED APPLICATION

This Application is a divisional application of U.S. Ser. No. 12/900,285, filed Oct. 7, 2010, which claims the benefit of U.S. Provisional Patent Application No. 61/253,790 filed Oct. 21, 2009, in the name of YOO et al., the disclosure of which is expressly incorporated herein by reference in its entirety.

BACKGROUND

Field

Aspects of the present disclosure relate generally to wireless communication systems, and more particularly to controlling the rate of downlink communications from user equipment in a wireless communication system.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method for wireless communication with a serving base station in the presence of interference from an interfering base station includes acquiring a reference signal from an interfering base station. The method also includes obtaining a timing reference from the acquired reference signal of the interfering base station, and communicating with the serving base station based on the timing reference from the interfering base station.

In another aspect, an apparatus is operable in a wireless communication system with a serving base station in the presence of interference from an interfering base station. The apparatus has means for acquiring a reference signal from an interfering base station, means for obtaining a timing reference from the acquired reference signal of the interfering base station, and means for communicating with the serving base station based on the timing reference from the interfering base station.

In another aspect, a computer program product, for wireless communications in a wireless network with a serving base station in the presence of interference from an interfering base station, has a computer-readable medium having program code recorded thereon. The program code includes program code to acquire a reference signal from an interfering base station, program code to obtain a timing reference from the acquired reference signal of the interfering base station, and program code to communicate with the serving base station based on the timing reference from the interfering base station.

In another aspect, an apparatus is operable in a wireless communication system with a serving base station in the presence of interference from an interfering base station. The apparatus has processor(s) and a memory coupled to the processor(s). The processor(s) is configured to acquire a reference signal from an interfering base station, to obtain a timing reference from the acquired reference signal of the interfering base station, and to communicate with the serving base station based on the timing reference from the interfering base station.

A method for wireless communication with a serving base station in the presence of interference from an interfering base station includes acquiring a first reference signal from a strong interfering base station. The method also includes obtaining a first frequency reference from the first reference signal, and communicating with the serving base station based on the first frequency reference from the interfering base station.

In another aspect, an apparatus is operable in a wireless communication system with a serving base station in the presence of interference from an interfering base station. The apparatus has means for acquiring a first reference signal from a strong interfering base station, means for obtaining a first frequency reference from the first reference signal, and means for communicating with the serving base station based on the first frequency reference from the interfering base station.

In another aspect a computer program product, for wireless communications in a wireless network with a serving base station in the presence of interference from an interfering base station, includes a computer-readable medium having program code recorded thereon. The program code includes program code to acquire a first reference signal from a strong interfering base station, program code to obtain a first frequency reference from the first reference signal, and program code to communicate with the serving base station based on the first frequency reference from the interfering base station.

In another aspect, an apparatus is operable in a wireless communication system with a serving base station in the presence of interference from an interfering base station. The apparatus has processor(s) and a memory coupled to the processor(s). The processor(s) is configured to acquire a first reference signal from a strong interfering base station, to obtain a first frequency reference from the first reference signal, and to communicate with the serving base station based on the first frequency reference from the interfering base station.

In another embodiment, a method for wireless communication with a serving base station in the presence of interference from an interfering base station includes acquiring a first reference signal from a first base station. The method also includes constructing a first power delay profile (PDP) from the first reference signal, acquiring a second reference signal from a second base station, and constructing a second power delay profile from the second reference signal. The method further includes constructing a composite power delay profile from the first and second power delay profiles, and generating a timing reference for a combined signal from the composite power delay profile.

In another aspect, an apparatus is operable in a wireless communication system with a serving base station in the presence of interference from an interfering base station. The apparatus has means for acquiring a first reference signal from a first base station, means for constructing a first power delay profile (PDP) from the first reference signal, and means for acquiring a second reference signal from a second base station. The apparatus also has means for constructing a second power delay profile from the second reference signal, means for constructing a composite power delay profile from the first and second power delay profiles, and means for generating a timing reference for a combined signal from the composite power delay profile.

In another aspect a computer program product, for wireless communications in a wireless network with a serving base station in the presence of interference from an interfering base station, includes a computer-readable medium having program code recorded thereon. The program code includes program code to acquire a first reference signal from a first base station, program code to construct a first power delay profile (PDP) from the first reference signal, and program code to acquire a second reference signal from a second base station, Also included is program code to construct a second power delay profile from the second reference signal, program code to construct a composite power delay profile from the first and second power delay profiles, and program code to generate a timing reference for a combined signal from the composite power delay profile.

In another aspect, an apparatus is operable in a wireless communication system with a serving base station in the presence of interference from an interfering base station. The apparatus has processor(s) and a memory coupled to the processor(s). The processor(s) is configured to acquire a first reference signal from a first base station, to construct a first power delay profile (PDP) from the first reference signal., and to acquire a second reference signal from a second base station. The processor(s) is also configured to construct a second power delay profile from the second reference signal, to construct a composite power delay profile from the first and second power delay profiles, and to generate a timing reference for a combined signal from the composite power delay profile.

In a further embodiment, a method for wireless communication with a serving base station in the presence of interference from an interfering base station includes extracting a reference signal from a received signal, the reference signal being associated with a strongest interfering base station from multiple detected base stations. The method also includes subtracting the reference signal from the received signal, and extracting multiple reference signals from the received signal. The reference signals are associated with the detected base stations. The method further includes subtracting the reference signals from the received signal, estimating a composite frequency error using the reference signal and the multiple reference signals, and enabling a frequency tracking loop based on the composite frequency error. The method also includes estimating a frequency offsets associated with the detected base stations, and compensating for a residual frequency error for one of the detected base stations using the composite frequency error and one of the frequency offsets associated with one of the detected base stations.

In another aspect an apparatus is operable in a wireless communication system with a serving base station in the presence of interference from an interfering base station. The apparatus comprises means for extracting a reference signal from a received signal, the reference signal being associated with a strongest interfering base station from multiple detected base stations. The apparatus also includes means for subtracting the reference signal from the received signal, and means for extracting multiple reference signals from the received signal. The multiple reference signals are associated with the detected base stations. The apparatus also includes means for subtracting the reference signals from the received signal, and means for estimating a composite frequency error using the reference signal and the reference signals. The apparatus also includes means for enabling a frequency tracking loop based on the composite frequency error, and means for estimating multiple frequency offsets. The frequency offsets are associated with the detected base stations, and means for compensating for a residual frequency error for one of the detected base stations using the composite frequency error and one of the frequency offsets associated with one of the detected base stations.

In another aspect a computer program product, for wireless communications in a wireless network with a serving base station in the presence of interference from an interfering base station, comprises a computer-readable medium having program code recorded thereon. The program code comprises program code to extract a reference signal from a received signal, the reference signal being associated with a strongest interfering base station from multiple detected base stations. The program code also includes program code to subtract the reference signal from the received signal, and program code to extract multiple reference signals from the received signal. The multiple reference signals are associated with the detected base stations. The program code also includes program code to subtract the multiple reference signals from the received signal, and program code to estimate a composite frequency error using the reference signal and the multiple reference signals. The program code also includes program code to enable a frequency tracking loop based on the composite frequency error, program code to estimate multiple frequency offsets associated with the detected base stations, and program code to compensate for a residual frequency error for one of the detected base stations using the composite frequency error and one of the frequency offsets associated with one of the detected base stations.

In another aspect an apparatus is operable in a wireless communication system with a serving base station in the presence of interference from an interfering base station. The apparatus comprises processor(s) and a memory coupled to the processor(s). The processor(s) is configured to extract a reference signal from a received signal, the reference signal being associated with a strongest interfering base station from multiple detected base stations. The processor(s) is also configured to subtract the reference signal from the received signal, and to extract multiple reference signals from the received signal. The multiple reference signals are associated with the multiple detected base stations. The processor(s) is also configured to subtract the multiple reference signals from the received signal, to estimate a composite frequency error using the reference signal and the multiple reference signals, and to enable a frequency tracking loop based on the composite frequency error. The processor(s) is also configured to estimate multiple frequency offsets associated with the multiple detected base stations, and to compensate for a residual frequency error for one of the multiple detected base stations using the composite frequency error and one of the multiple frequency offsets associated with the one of the detected base stations.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), Telecommunications Industry Association's (TIA's) CDMA2000®, etc. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
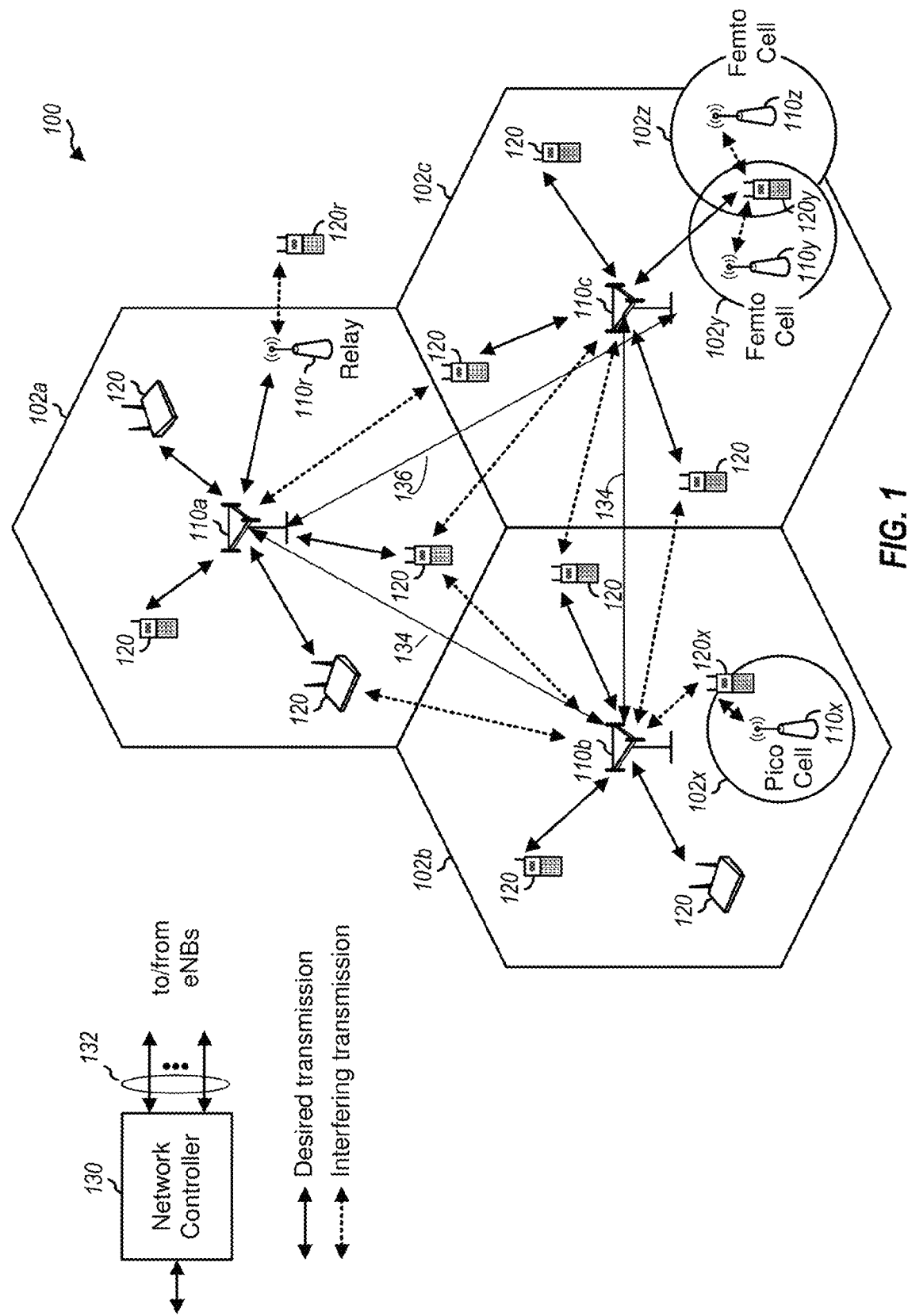
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for operation in either fully synchronous systems or locally synchronous systems (e.g., where a femto cell obtains its timing from a macro cell).

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Single carrier frequency division multiple access (SC-FDMA), which utilizes single carrier modulation and frequency domain equalization is a transmission technique. SC-FDMA has similar performance and essentially the same overall complexity as those of an OFDMA system. SC-FDMA signal has lower peak-to-average power ratio (PAPR) because of its inherent single carrier structure. In uplink communication using SC-FDMA, lower PAPR benefits the mobile terminal in terms of transmit power efficiency.

Figure 2:
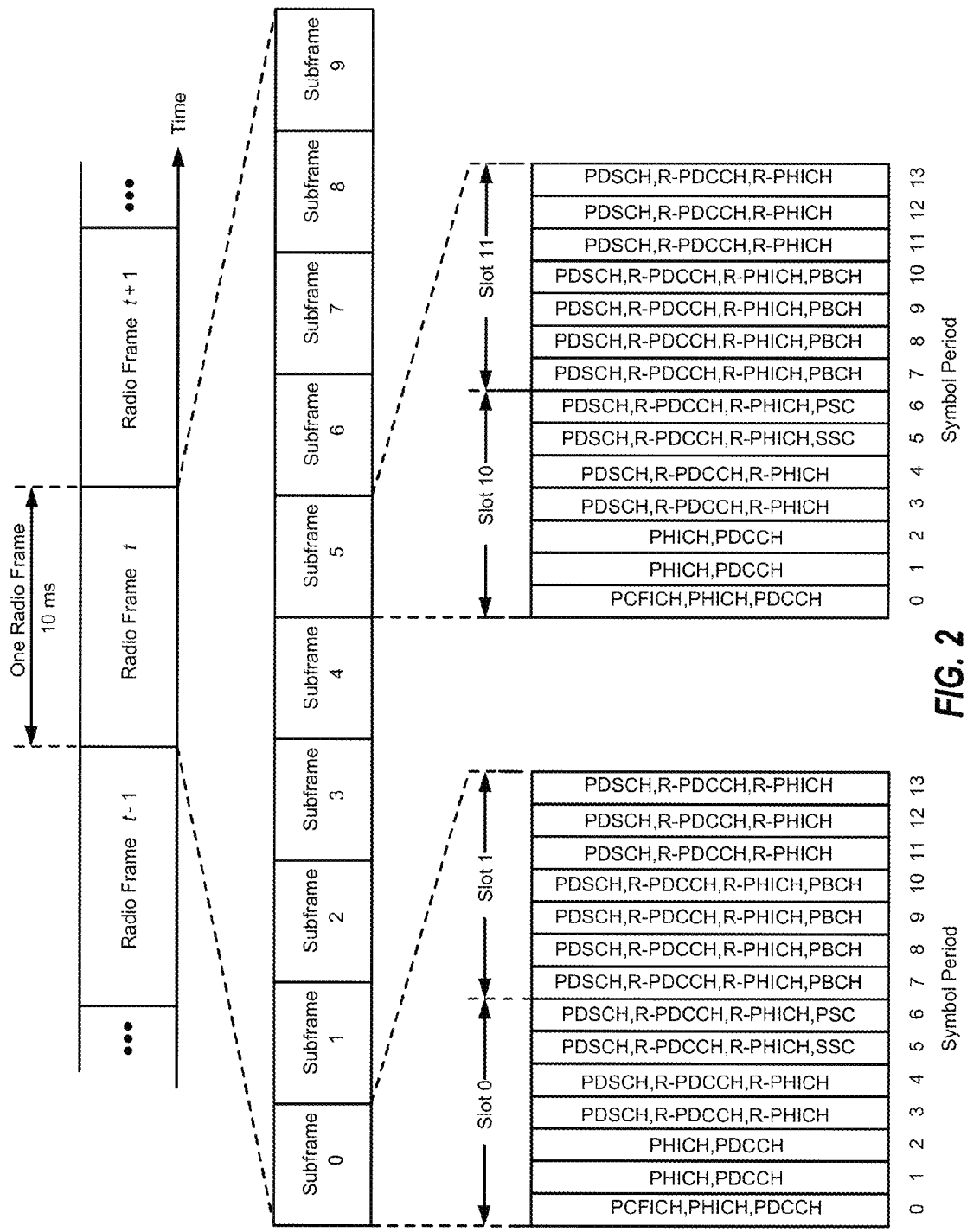
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks (RBs). Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search can be less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

The PSS, SSS, CRS, PBCH, and other such signals and channels used in LTE/-A are described in 3GPP TS 36.211, entitled "Evolved Universal Terrestrial Radio Access (E-UTRA); Physical Channels and Modulation," which is publicly available. In one aspect, a channel structure is provided that preserves low peak to average power ratio (PAPR) (i.e., at any given time, the channel is contiguous or uniformly spaced in frequency) properties of a single carrier waveform.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

If server selection is based predominantly on downlink received signal strength, as provided in the LTE Release 8 standard, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is time division multiplexing (TDM) partitioning. TDM partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs.

Figure 4:
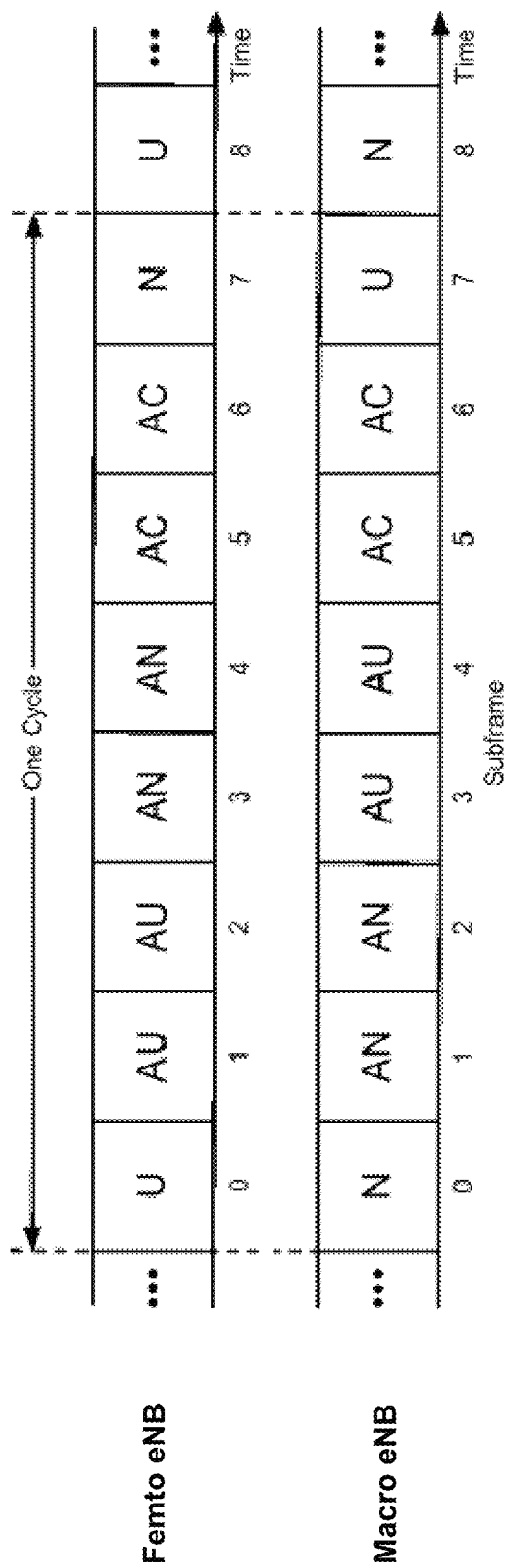
FIG. 4 is a block diagram conceptually illustrating adaptive resource partitioning in a heterogeneous network according to one aspect of the disclosure.

FIG. 4 is a block diagram illustrating TDM partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷$3\times10^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

In one aspect, the downlink resources in LTE are partitioned into smaller elemental time and frequency resources. For example, in the time dimension, a radio frame has a 10 ms duration and is divided into ten subframes, each of 1 ms duration. Furthermore, each subframe is divided into two 0.5 ms slots. In the case of a normal cyclic prefix length, each slot has seven OFDM symbols. In the frequency dimension a Resource Block (RB) is a group of 12 subcarriers each with a subcarrier bandwidth of 15 kHz. A subcarrier may also be denoted as a tone. A Resource Element (RE) is the smallest resource unit in LTE which consists of one subcarrier and one OFDM symbol.

In another aspect, certain resource blocks are dedicated for special signals such as synchronization signals, reference signals, control signals, and broadcast system information. Three synchronization steps occur in LTE: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by detection of the SSS.

In one aspect, the PSS is based on a Zadoff-Chu sequence, a constant amplitude chirp-like digital sequence. In general, the PSS is detected non-coherently (i.e., detection without phase information) by the UE because there is assumed to be no a priori channel information available by the UE. In another aspect, the SSS is based on a maximal length sequence (also known as M-sequence). Since detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be desired, for example, in the case of coherent interference from neighboring eNodeBs.

In another aspect, after PSS and SSS detection has been accomplished, for the case of new cell identification, the UE acquires and tracks certain Reference Signals (RS) from the LTE downlink. The LTE downlink, in one example, may contain three unique RS types as follows:
Cell-specific RSs, broadcast to all UEs within a cell,
UE-specific RS s, intended only for certain UEs, or
MBSFN-specific RSs, intended only for Multimedia Broadcast Single Frequency Network (MBSFN) operation.

Figure 3:
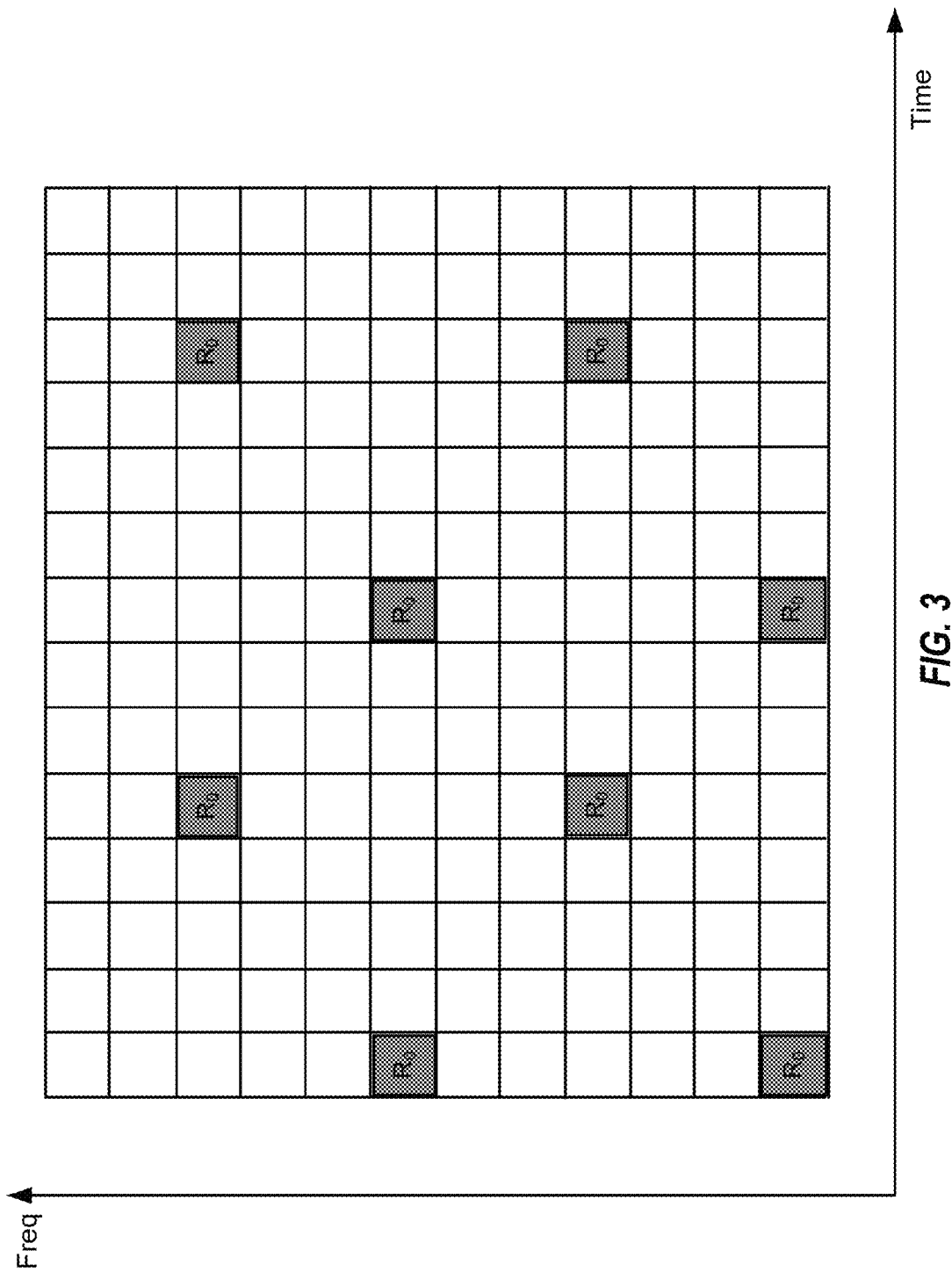
FIG. 3 illustrates an example cell-specific Reference Signal (RS) arrangement with a normal cyclic prefix (CP) length.

In one aspect, the LTE downlink provides RSs within certain locations within an OFDM time-frequency lattice. FIG. 3 illustrates an example cell-specific Reference Signal (RS) arrangement with a normal cyclic prefix (CP) length. As shown, the RS symbols are shown staggered in the time dimension and frequency dimension according to the expected channel coherence bandwidth and maximum Doppler spread, respectively.

In another aspect, each RS is comprised of quaternary phase shift keyed (QPSK) modulation using a length-31 Gold sequence for good cross-correlation properties. The cell-specific RS also contains a cell identification field and a cell-specific frequency shift to mitigate interference from adjacent cells.

Figure 5:
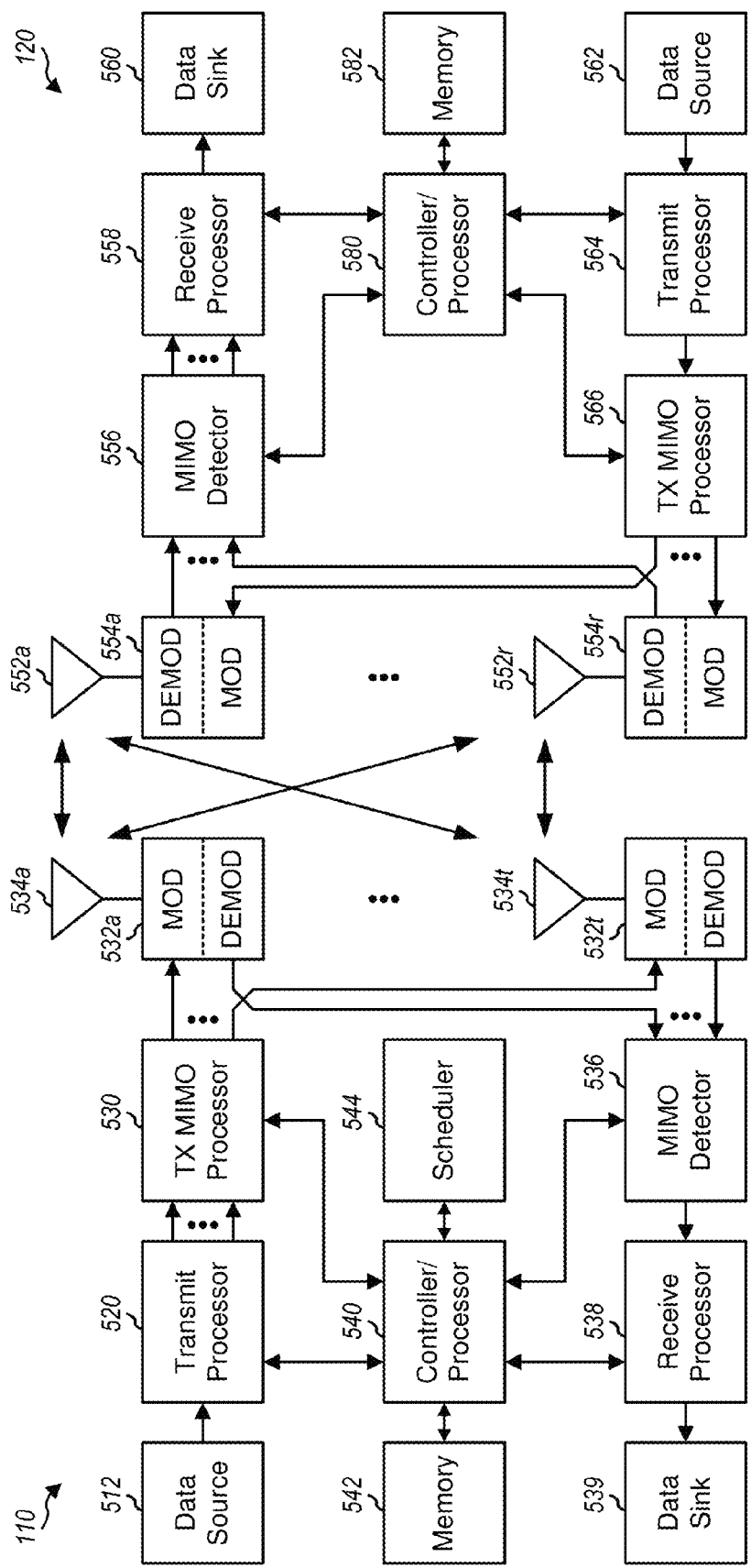
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 534a through 534t, and the UE 120 may be equipped with antennas 552a through 552r.

At the base station 110, a transmit processor 520 may receive data from a data source 512 and control information from a controller/processor 540. The control information may be for the PBCH, PCFICH, PHICH, PDCCH, etc. The data may be for the PDSCH, etc. The processor 520 may process (e.g., encode and symbol map) the data and control information to obtain data symbols and control symbols, respectively. The processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the base station 110 and may provide received signals to the demodulators (DE-MODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the base station 110. At the base station 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the base station 110 and the UE 120, respectively. The processor 540 and/or other processors and modules at the base station 110 may perform or direct the execution of various processes for the techniques described herein. The processor 580 and/or other processors and modules at the UE 120 may also perform or direct the execution of the functional blocks illustrated in FIGS. 4 and 5, and/or other processes for the techniques described herein. The memories 542 and 582 may store data and program codes for the base station 110 and the UE 120, respectively. A scheduler 544 may schedule UEs for data transmission on the downlink and/or uplink.

In one configuration, the UE 120 configured for wireless communication includes means for acquiring a reference signal from an eNodeB, means for obtaining a timing reference from the acquired reference signal, means for adding a backoff to the timing reference to generate a backed-off timing reference, and means for using the backed-off timing reference as a timing reference for a serving eNodeB.

The UE 120 may also include means for obtaining a frequency reference from an acquired reference signal, means for estimating a frequency offset difference between eNodeBs using frequency references, and means for compensating for the frequency offset difference in the serving eNodeB.

The UE 120 may also include means for constructing a power delay profile (PDP) from a first reference signal, means for constructing a composite PDP from other PDPs, and means for generating a timing reference for a combined signal from the composite PDP.

The UE 120 may also include means for extracting one or more reference signals from a received signal, means for subtracting one or more reference signals from the received signal, means for estimating a composite frequency error using one or more reference signals, means for enabling a frequency tracking loop based on the composite frequency error, means for estimating a plurality of frequency offsets, and means for compensating for a residual frequency error using the composite frequency error and one or more frequency offsets.

In one aspect, the aforementioned means may be the processor(s), the controller/processor 580, the memory 582, the receive processor 558, the MIMO detector 556, the transmit processor 564, the TX MIMO processor, 566, the demodulators 554a, and the antennas 552a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In certain situations a UE may desire to connect to an eNodeB having weaker signal strength (i.e., a weaker eNodeB) than an eNodeB with the highest signal strength (i.e., a strongest eNodeB). In one example, it may be beneficial to associate the UE with a weaker eNodeB which has a smaller path loss even if its signal strength is lower than a strongest eNodeB. In another example, the strongest eNodeB may be part of a closed subscriber group (CSG) which includes cells that are only accessible to a restricted set of UEs. In these scenarios the pilot/RS tones of a weak eNodeB may collide with the RS tones or data tones of a strong interferer. Specifically, a conventional time tracking loop (TTL) or frequency tracking loop (FTL), which relies on RS tones or other signals or characteristics of the serving eNodeB, may not function properly in the case of severe interference.

To address these problems in OFDMA wireless systems such as LTE, various solutions are presented.

If the UE attempts to track a timing reference of the weaker serving eNodeB, the tracking may not be reliable or it may even fail. Even if the tracking is performed reliably, the timing reference obtained via the tracking may not be the desired timing reference for the UE. This is because although the timing reference obtained from the reference signal of the serving eNodeB may function for serving eNodeB channel estimation and decoding, the serving eNodeB timing reference is not necessarily desired for the purpose of canceling out the interference. Instead, if the UE tracks the stronger non-serving/interfering eNodeB the ability to cancel the interfering signal will improve due to tracking of the interfering signal power. Although the timing obtained by such a manner may be off from the serving eNodeB timing, the improved cancellation ability may translate to improved overall signal quality, with the serving eNodeB timing estimated from the non-serving eNodeB timing.

In a first example, the UE may perform interferer timing tracking. The timing is used by the UE to estimate the serving eNode B channel. The arriving time or dominant path of downlink signals from different eNodeBs may be close to each other. In such situations, the timing reference of a stronger non-serving/interfering eNodeB may be roughly aligned to the timing reference of the desired, but weaker, serving eNodeB. In this scenario, where the timing of the serving eNodeB and interfering eNodeB are nearly simultaneous, the UE may track and use the timing of the stronger non-serving/interfering eNodeB as the timing reference for the serving eNodeB. In one aspect, the timing reference could be obtained from a frame synchronization, timing marker, pseudonoise (PN) code, etc.

Even in the case of a synchronous network, the timing reference of the serving eNodeB may still differ from that of an interfering eNodeB due to propagation delay differences. For example, in certain situations the timing of the serving eNodeB may be earlier than the timing of the interfering eNodeB and tracking of the interfering eNodeB timing reference may result in the loss of early channel taps arriving from the serving eNodeB, thus leading to performance degradation. One solution is to add a backoff in the detected interfering eNodeB timing reference to derive a backed-off interferer timing reference and to use the backed-off interferer timing reference as a timing reference for the serving cell. More detail about the backoff may be found in U.S. Provisional Patent Application No. 61/262,911 filed Nov. 19, 2009, in the names of YOO et al., the disclosure of which is expressly incorporated herein by reference in its entirety. In certain other situations the serving eNodeB timing may be later than the timing of the interfering eNodeB, in which case the channel tap truncation window would be extended to catch later serving eNodeB channel taps.

Figure 6:
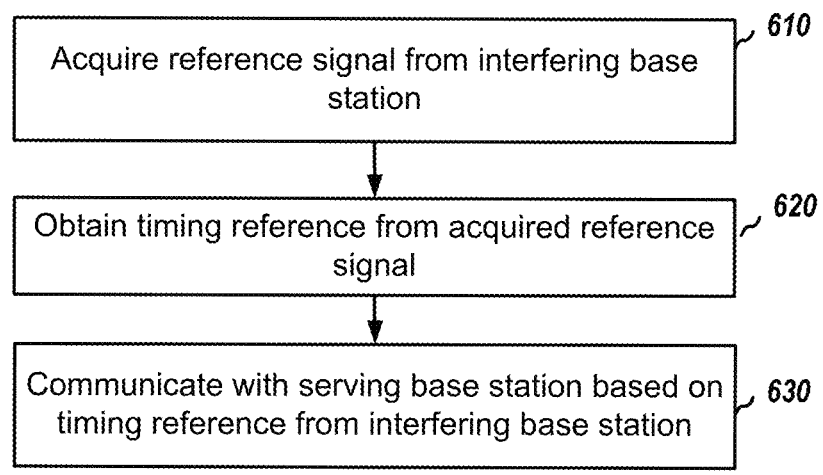
FIG. 6 illustrates a first example flow diagram for acquiring and using a reference signal.

FIG. 6 illustrates a first example flow diagram for acquiring and using a reference signal from an interfering eNodeB. In block 610, a reference signal is acquired from an interfering, and possibly strong, base station (such as an evolved NodeB (eNodeB) in an LTE network). Then a timing reference is acquired from the reference signal, as shown in block 620. The timing reference is then used when communicating with a serving base station, as shown in block 630.

In a second example, a UE may perform interferer frequency tracking. In a wireless system where the frequency offsets among neighboring eNodeBs are small, a UE may track the carrier frequency of an interfering eNodeB, for example, an eNodeB with a stronger signal strength, rather than tracking the carrier frequency of the serving eNodeB. In one example, the UE does not compensate for the possible frequency offset that may exist between the carrier frequencies of the interfering eNodeB and the serving eNodeB, when estimating the serving eNode B channel. In another example, the UE may estimate the frequency offset difference between the serving eNodeB and the interfering eNodeB. The UE then compensates for this frequency offset difference before using the frequency of the interfering eNodeB when processing signals from the serving eNodeB.

Figure 7:
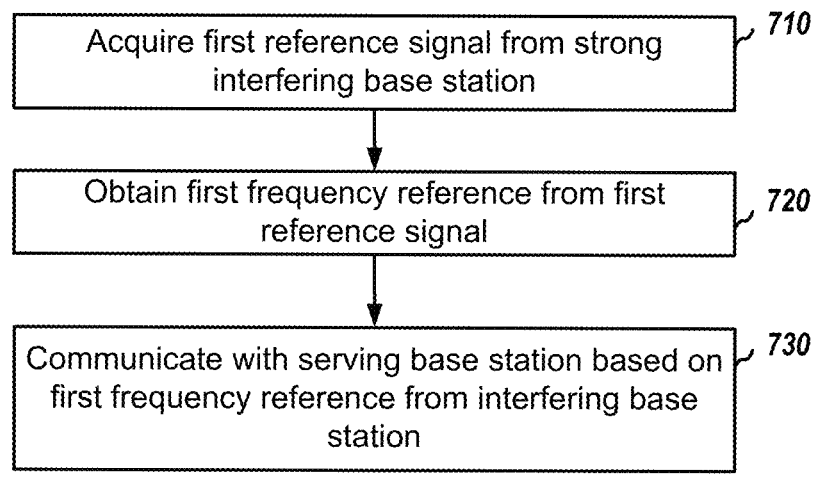
FIG. 7 illustrates a second example flow diagram for acquiring and using a reference signal.

FIG. 7 illustrates a second example flow diagram for acquiring and using a reference signal from an interfering base station (such as an eNodeB in an LTE network). In block 710, a first reference signal from a strong interfering base station is acquired. Then a first frequency reference from the first reference signal is obtained, as shown in block 720. The frequency reference is then used to communicate with the serving base station, as shown in block 730.

In a third example, a UE may perform composite timing tracking. A UE may track the combined timing references of received eNodeB reference signals (RSs), including those from the desired serving eNodeB as well as from interfering eNodeBs to provide a composite timing tracking. For example, the UE can first detect the reference signal from the strongest interfering eNodeB and construct a power delay profile (PDP) from its measurements. PDPs are based on common reference signal (CRS) tones. The PDP represents the location and strength of the channel taps.

If there is one interfering eNodeB, the UE can then cancel out the reference signal from the interfering eNodeB to obtain the reference signal of the serving eNodeB and then construct the PDP for the serving eNodeB. If applicable, such as in the case of multiple interfering eNodeBs, the UE can cancel out the reference signal (and other signals) from the strongest interfering eNodeB to obtain a different reference signal from another interfering eNodeB. The UE can then construct a power delay profile (PDP) from that measurement. The procedure may repeat until the UE obtains PDPs of all detected eNodeBs (including the serving eNodeB).

Finally, the UE may combine and weight PDPs to generate a composite PDP. PDPs may be combined using a formula such as $X_{composite}[k]=x_1[k]w_1+x_2[k]w_2$ where $X_{composite}$ is the combined PDP, $x_1$ is the PDP of cell 1, $x_2$ is the PDP of cell 2, $w_1$ is the weight adjustment for the PDP of cell 1, $w_2$ is the weight adjustment for the PDP of cell 2, and k is the channel tap index. Further $x_n w_n$ pairs may be added for multiple interfering eNodeBs. The composite PDP is then used to provide timing to the UE.

Figure 8A:
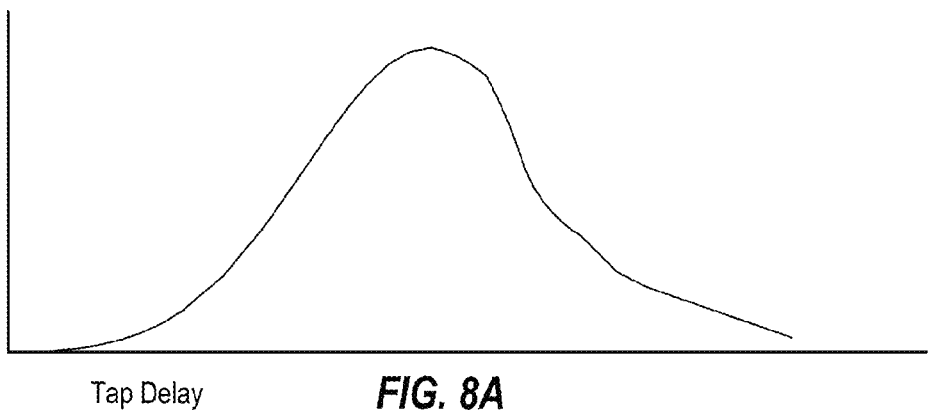
FIG. 8A, 8B, and 8C illustrate-sample graphs of power delay profiles.

FIG. 8A shows a sample PDP graph for sample interfering eNodeB 1. Signal strength is displayed on the Y axis and tap delay is displayed on the X axis. The PDP graph represents which channel tap has a higher signal strength. The center of gravity of the PDP graph may be used for the timing reference. The timing is used, for example, to estimate the serving eNodeB channel.

Figure 8B:
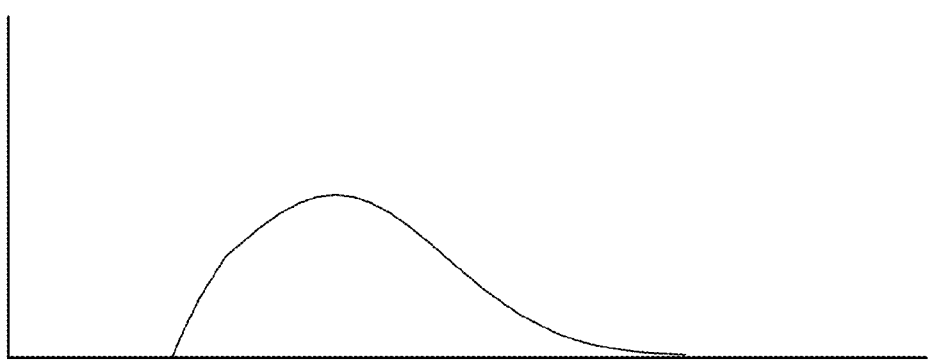
Figure 8C:
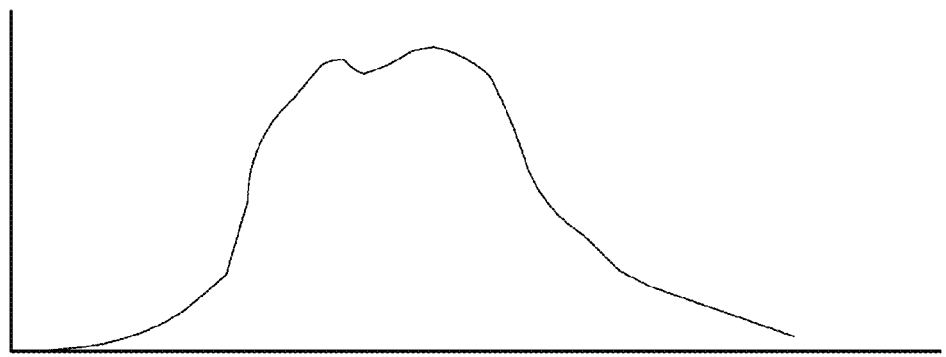

Using the composite PDP for timing provides several benefits. First, use of the composite PDP decreases the chance that the UE will lose its timing signal over a scenario where the UE relied only on the weak serving eNodeB for timing. If the UE relied only on the weak serving eNodeB, it may lose its timing due to weak serving eNodeB signal strength. Second, use of the composite PDP decreases the UE's reliance on the interfering eNodeB for timing as the center of gravity of the composite PDP will be closer to that of the serving eNodeB compared to the PDP of strong interfering cell alone. For example, FIG. 8B shows a sample PDP graph for sample serving eNodeB 2. FIG. 8C shows a sample composite PDP graph (not to scale) showing the combined PDPs of samples interfering eNodeB 1 and serving eNodeB 2. The center of gravity of the graph of FIG. 8C is closer to the center of gravity of the graph of FIG. 8B than the graph of FIG. 8A would be taken alone.

In one example, the combination of all PDPs may be performed using equal weight combining, which gives a natural higher weight toward stronger eNodeBs as the magnitude of each PDP is proportional to received power on CRS tones from each eNodeB. In another example, the combination of all PDPs may be performed using unequal weight combining, e.g., boosting the serving eNodeB PDP to ensure that weak serving eNodeB channel taps are captured and reflected in timing tracking. Unequal weight combining may provide better results than equal weight combining.

One example of unequal weight combining involves giving higher weight to the PDP of the serving eNodeB. This may be done by applying a fixed weight that boosts the value of the serving eNodeB's PDP. The weight may also be determined based on measurements of the received signals. For example, noting that CRS tones are transmitted from each cell and that data tones may or may not be transmitted by each cell, and also noting that a PDP fails to capture the presence or absence of the data tones, the weight may be based on non-CRS tone measurements to take into account the presence or absence of data tone transmission from each cell. Along this approach, the weight may be based on the interference level seen on non-CRS tones of the serving eNodeB. The aggregate received power from non-serving eNodeBs is obtained. If the aggregate interference level on non-CRS tones is high, other interferers may actively be transmitting, and the serving eNodeB signal is not boosted as much as it would be if the aggregate interference is low. When the aggregate interference on non-CRS tones is low, then some of the interfering eNodeBs may not be transmitting data and the serving eNodeB weight may be boosted further. This approach may be used to give higher weight to eNodeBs transmitting data using non-CRS tones (such as the serving eNodeB) over eNodeBs not transmitting data.

Another example of unequal weight combining involves utilizing the UE's knowledge of TDM partitioning (as explained above with respect to FIG. 4), such that eNodeBs partitioned with the serving eNodeB are given a lower weight. The serving eNodeB and other eNodeBs that are not partitioned with, or belong to the same partition as, the serving eNodeB, are given a higher weight. This approach may be used with TDM schemes such as those described above, including ARPI. For example, if the UE knows that certain eNodeBs are not transmitting during subframes where the serving eNodeB transmits, the signal from those eNodeB may be given lower weight. For eNodeBs transmitting during subframes where the serving eNodeB transmits, a higher weight may be used.

Figure 9:
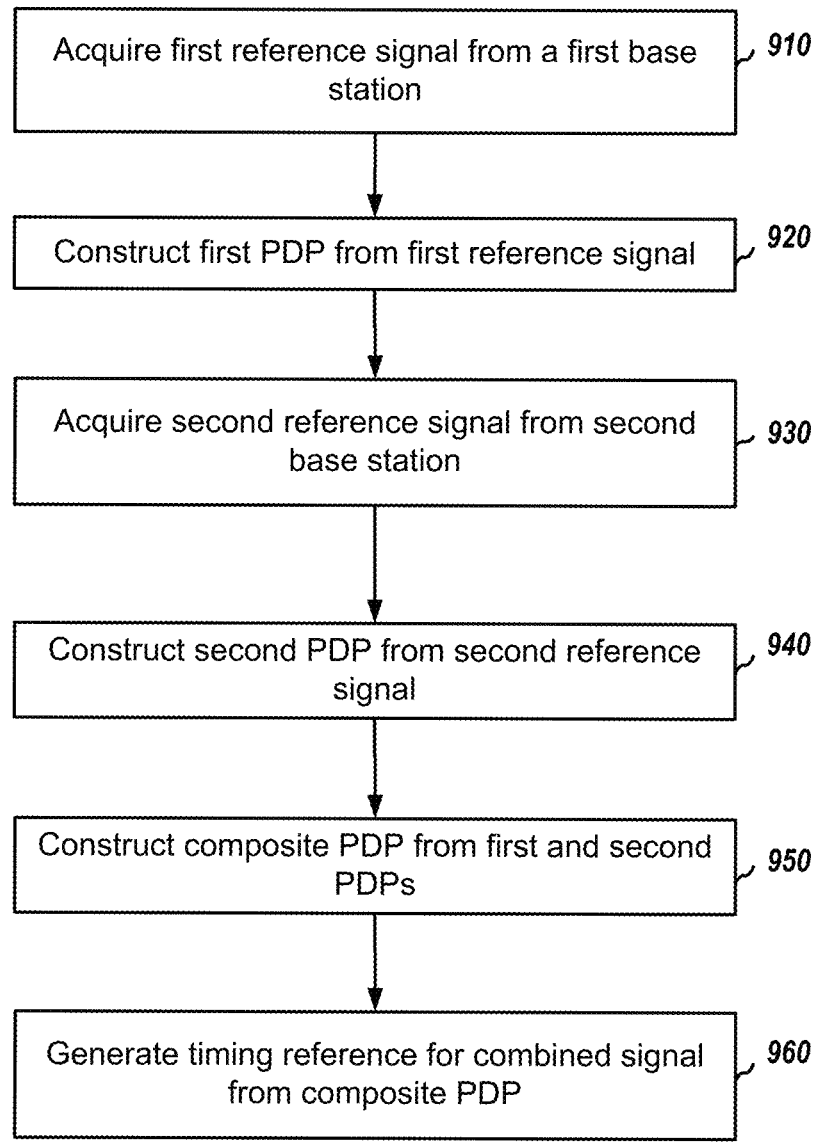
FIG. 9 illustrates a third example flow diagram for acquiring and using a reference signal.

FIG. 9 illustrates a third example flow diagram for acquiring and using a reference signal from two base stations (such as eNodeBs in an LTE network). In block 910, a first reference signal from a first base station is acquired. Then, a first power delay profile (PDP) from the first reference signal is constructed, as shown in block 920. A second reference signal from a second base station is then acquired, as shown in block 930. A second power delay profile (PDP) from the second reference signal is then constructed, as shown in block 940. In block 950, a composite power delay profile (PDP) is constructed from power delay profiles previously constructed. In one example, equal weighted combining is used. In another example, unequal weighted combining is used. In block 960, the composite power delay profile (PDP) is used to generate a timing reference for the combined signal. That is, the new timing reference is based on the composite power delay profile (PDP).

In a fourth example, the UE may track the carrier frequencies of signals from eNodeBs including the serving eNodeB and interfering eNodeBs. This fourth example illustrates composite frequency tracking. For example, the UE can first detect the reference signal from the strongest interfering eNodeB. If applicable, the UE can cancel out the reference signal (and other signals) from the strongest interfering eNodeB to obtain a different reference signal from another interfering eNodeB. The procedure may repeat until the UE obtains RSs of all detected eNodeBs (including the serving eNodeB). Finally, the UE can use all the obtained RSs to estimate a composite frequency error. For example, if a strong interfering eNodeB has a signal at 2 GHz+20 Hz and a weak serving eNodeB has a signal at 2 GHz+10 Hz, the combined frequency may be 2 GHz+19 Hz due to the strength of the interferer. If the UE is tracking the combined signal, the UE can later compensate for the 9 Hz difference between the combined frequency and the serving frequency for the purpose of serving eNodeB channel estimation by applying a phase rotation.

In one aspect, due to the presence of the RS of the strong interfering eNodeB, the UE will not lose frequency synchronization. Also, due to the presence of RSs of the other eNodeBs, the frequency offset estimation will be robust and stable against network changes such as sudden powering off of a femto cell. In one example, the RSs may be combined using equal weight combining, which gives higher weight toward stronger eNodeBs. In another example, the RSs may be combined using unequal weight combining. Signals other than RSs may also be used or combined with RSs, such as other synchronization signals in LTE such as the Primary Synchronization Signal (PSS) and the Secondary Synchronization Signal (SSS). In one aspect, the estimated composite frequency error enables a frequency tracking loop in the UE. Additionally, the UE may estimate frequency offsets of individual eNodeBs (including the serving eNodeB). For example, the composite frequency error estimated from the composite RS enables a frequency tracking loop, while the frequency offset for each eNodeB may be used by the UE to compensate for the effect of a residual frequency error from each eNodeB for enhanced demodulation and decoding.

Figure 10:
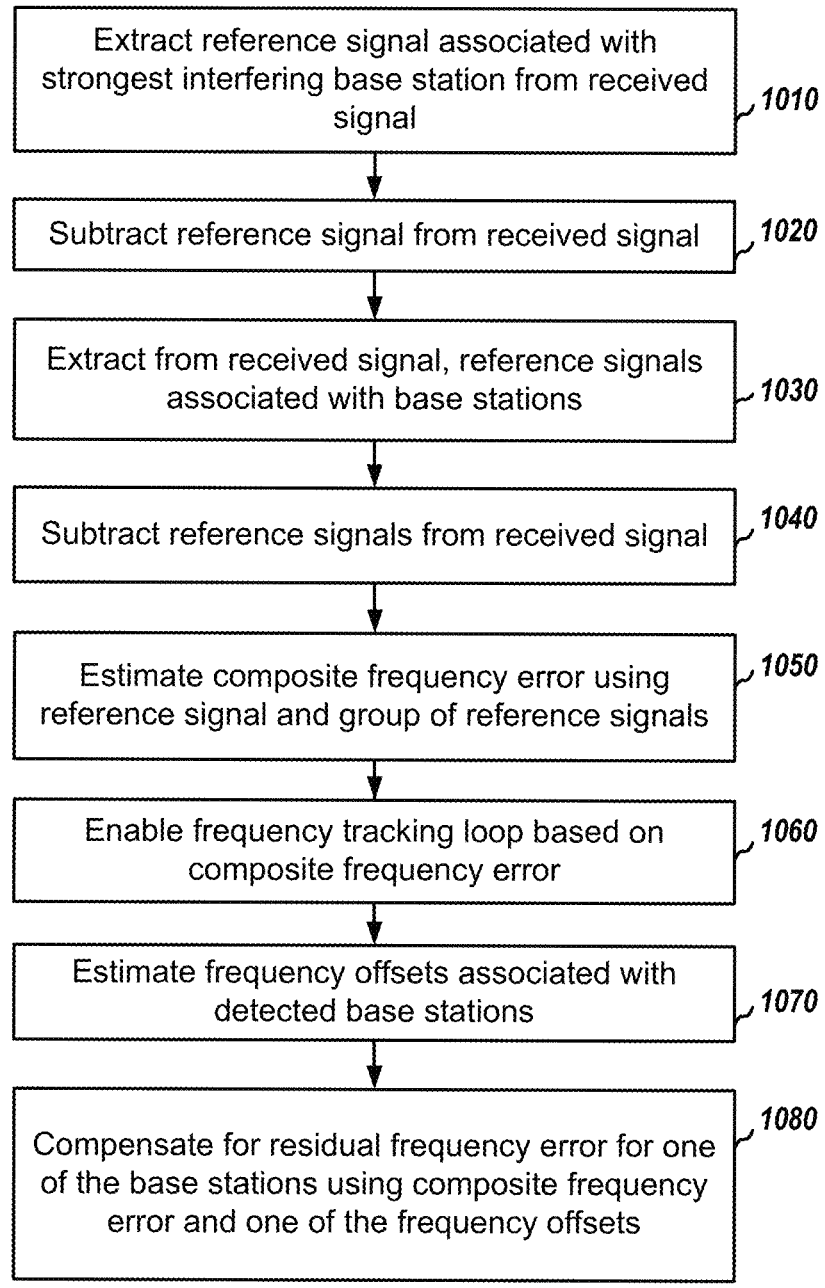
FIG. 10 illustrates a fourth example flow diagram for acquiring and tracking a reference signal.

FIG. 10 illustrates a fourth example flow diagram for acquiring and tracking a reference signal. In block 1010, a reference signal is extracted from the received signal. The reference signal is associated with a strongest interfering base station (such as an eNodeB in an LTE network) of multiple detected base stations. The reference signal is then subtracted from the received signal, as shown in block 1020. In block 1030, other reference signals are extracted from the received signal. The reference signals are associated with the detected base stations. In one aspect, the reference signal and the group of reference signals extracted from the received signal are stored in a memory for later use. The reference signals are then subtracted from the received signal, as shown in block 1040. Next, a composite frequency error is estimated using the reference signal and the group of reference signals which have been extracted from the received signal, as shown in block 1050. In block 1060, a frequency tracking loop based on the composite frequency error is enabled. In block 1070, frequency offsets associated with the detected base stations are estimated. In block 1080, a residual frequency error of one of the detected base stations is compensated for using the composite frequency error and one of the frequency offsets associated with the detected base stations. In one aspect, the process in block 1080 may be repeated for multiple detected base stations and multiple frequency offsets.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by a user equipment (UE) for communicating with a serving base station in presence of interference from an interfering base station, the method comprising:
    acquiring by the UE, a reference signal from the interfering base station, the interfering base station being stronger than the serving base station;
    obtaining by the UE, a first timing reference from the acquired reference signal of the interfering base station;
    tracking the first timing from the interfering base station in place of tracking a carrier timing of the serving base station;
    acquiring by the UE, a second reference signal from the serving base station;
    obtaining by the UE, a second timing reference from the second reference signal;
    generating by the UE, an offset timing difference between the serving base station and the interfering base station using the first and second timing references; and
    communicating by the UE, with the serving base station by processing signals received from the serving base station using the tracked first timing from the interfering base station and the offset timing difference.

2. The method of claim 1, wherein the interfering and serving base stations are evolved NodeBs (eNBs) in a long term evolution (LTE) network.

3. A user equipment (UE) for wireless communication with a serving-base station in presence of interference from an interfering base station, the UE comprising: -means for acquiring a reference signal from the interfering base station, the interfering base-station being stronger than the serving base station;
    means for obtaining a timing reference from the acquired reference signal of the interfering-base station;
    means for tracking the first timing from the interfering base station in place of tracking a carrier timing of the serving base station;
    means for acquiring by the UE, a second reference signal from the serving base station;
    means for obtaining by the UE, a second timing reference from the second reference signal;
    means for generating by the UE, a timing offset difference between the serving base station and the interfering base station using the first and second timing references;
    means for communicating with the serving base station by processing signals received from the serving base station using the tracked first timing from the interfering base station and the offset timing difference.

4. The UE of claim 3, wherein the interfering and serving base stations are evolved NodeBs (eNBs) in a long term evolution (LTE) network.

5. A non-transitory computer-readable medium storing computer executable code for wireless communication by a user equipment (UE) for communicating with a serving base station in presence of interference from an interfering base station, comprising code for: acquiring a reference signal from the interfering base station, the interfering base station being stronger than the serving base station; obtaining a timing reference from the acquired reference signal of the interfering base station;

tracking the first timing from the interfering base station in place of tracking a carrier timing of the serving base station;
acquiring by the UE, a second reference signal from the serving base station;
obtaining by the UE, a second timing reference from the second reference signal;
generating by the UE, a timing offset difference between the serving base station and the interfering base station using the first and second timing references; and
communicating with the serving base station by processing signals received from the serving base station using tracked first timing from the interfering base station and the offset timing difference.

6. A user equipment (UE) operable for wireless communication with a serving base station in presence of interference from an interfering base station, the UE comprising: a memory; and at least one processor coupled to the memory, wherein the at least one processor is configured to: acquire a reference signal from the interfering base station, the interfering base station being stronger than the serving base station; obtain a timing reference from the acquired reference signal of the interfering base station;
track the first timing from the interfering base station in place of tracking a carrier timing of the serving base station;
acquire by the UE, a second reference signal from the serving base station;
obtain by the UE, a second timing reference from the second reference signal;
generate by the UE, a timing offset difference between the serving base station and the interfering base station using the first and second timing references
communicate with the serving base station by processing signals received from the serving base station using tracked first timing from the interfering base station and the offset timing difference.

7. A method for wireless communication by a user equipment (UE) for communicating with a serving base station in presence of interference from an interfering base station having a stronger signal than the serving base station, the method comprising:
acquiring by the UE, a first reference signal from the interfering base station;
obtaining by the UE, a first frequency reference from the first reference signal;
tracking the first frequency from the interfering base station in place of tracking a carrier frequency of the serving base station; acquiring by the UE, a second reference signal from the serving base station;
obtaining by the UE, a second frequency reference from the second reference signal;
generating by the UE, a frequency offset difference between the serving base station and the interfering base station using the first and second frequency references;
communicate with the serving base station by processing signals from the serving base station using the tracked first frequency from the interfering base station and the frequency offset difference.

8. The method of claim 7, wherein the interfering and serving base stations are evolved NodeBs (eNBs) in a long term evolution (LTE) network.

9. A user equipment (UE) for wireless communication with a serving base station in presence of interference from a interfering base station having a stronger signal than the serving base station, the UE comprising:

means for acquiring a first reference signal from the interfering base station;
means for obtaining a first frequency reference from the first reference signal;
means for tracking the first frequency from the interfering base station in place of tracking a carrier frequency of the serving base station;
means for acquiring a second reference signal from the serving base station;
means for obtaining a second frequency reference from the second reference signal;
generating a frequency offset difference between the serving base station and the interfering base station using the first and second frequency references; and
means for communicate with the serving base station by processing signals from the serving base station using the tracked first frequency from the interfering base station and the frequency offset difference.

10. The UE of claim 9, wherein the interfering and serving base stations are evolved NodeBs (eNBs) in a long term evolution (LTE) network.

11. A non-transitory computer-readable medium storing computer executable code for wireless communication by a user equipment (UE) for communicating with a serving base station in presence of interference from a interfering base station having a stronger signal than the serving base station, comprising code for:
acquiring a first reference signal from the interfering base station;
obtaining a first frequency reference from the first reference signal;
tracking the first frequency from the interfering base station in place of tracking a carrier frequency of the serving base station;
acquiring a second reference signal from the serving base station;
obtaining a second frequency reference from the second reference signal;
generating a frequency offset difference between the serving base station and the interfering base station using the first and second frequency references; and
communicate with the serving base station by processing signals from the serving base station using the tracked first frequency from the interfering base station and frequency offset difference.

12. A user equipment (UE) for wireless communication with a serving base station in presence of interference from a interfering base station having a stronger signal than the serving base station, the UE comprising: a memory; and at least one processor coupled to the memory, wherein the at least one processor is configured to:
acquire a first reference signal from the interfering base station;
obtain a first frequency reference from the first reference signal;
track the first frequency from the interfering base station in place of tracking a carrier frequency of the serving base station;
acquire a second reference signal from the serving base station;
obtain a second frequency reference from the second reference signal;
generating a frequency offset difference between the serving base station and the interfering base station using the first and second frequency references;
communicate with the serving base station by process signals from the serving base station using the tracked first frequency from the interfering base station and frequency offset difference.

\* \* \* \* \*